US010861171B2

(12) United States Patent
Zalevsky et al.

(10) Patent No.: US 10,861,171 B2
(45) Date of Patent: Dec. 8, 2020

(54) SYSTEM AND METHOD FOR OPTICAL MONITORING USING SYMMETRY CONDITION OF LIGHT FIELD

(71) Applicant: ContinUse Biometrics Ltd., Tel Aviv (IL)

(72) Inventors: Zeev Zalevsky, Rosh HaAyin (IL); Javier Garcia, Valencia (ES)

(73) Assignee: CONTINUSE BIOMETRICS LTD., Tel Aviv (IL)

( * ) Notice: Subject to any disclaimer, the term of this patent is extended or adjusted under 35 U.S.C. 154(b) by 0 days.

(21) Appl. No.: 16/822,476

(22) Filed: Mar. 18, 2020

(65) Prior Publication Data
US 2020/0302620 A1 Sep. 24, 2020

Related U.S. Application Data

(60) Provisional application No. 62/820,513, filed on Mar. 19, 2019.

(51) Int. Cl.
| | |
|---|---|
| *G01H 9/00* | (2006.01) |
| *G06T 7/246* | (2017.01) |
| *H04N 5/235* | (2006.01) |
| *G06T 5/50* | (2006.01) |
| *G01B 11/25* | (2006.01) |

(52) U.S. Cl.
CPC .............. *G06T 7/248* (2017.01); *G06T 5/50* (2013.01); *H04N 5/2353* (2013.01); *G01B 11/25* (2013.01); *G06T 2207/10016* (2013.01); *G06T 2207/10144* (2013.01); *G06T 2207/30004* (2013.01)

(58) Field of Classification Search
CPC .............. G01B 11/2513; G01B 11/162; G01B 11/2441; G01B 11/25; G01B 9/02083; G01B 9/02095; G01B 9/02094; G01B 9/02045; G01B 11/002; G01B 9/02041; G01B 9/0203; G01B 9/0201;
(Continued)

(56) References Cited

U.S. PATENT DOCUMENTS 5,166,742 A * 11/1992 Kobayashi ............. G01B 9/025
356/35.5
6,563,567 B1 * 5/2003 Komatsuda ......... G03F 7/70075
355/53
(Continued)

FOREIGN PATENT DOCUMENTS

WO WO-2018190111 A1 * 10/2018 ............. G02B 27/48

*Primary Examiner* — Daniel Chang
(74) *Attorney, Agent, or Firm* — Browdy and Neimark, PLLC (57) ABSTRACT

A system for monitoring parameters of a sample includes an imaging unit including a lens assembly and a detector unit configured for collecting light arriving from a region of interest on an object while being defocused with respect to the region of interest and generating defocused image data pieces indicative of light collected from the region of interest. The lens assembly includes at least one lens and is configured for defining at least one intermediate optical plane being a conjugate image plane or an intermediate Fourier plane with respect to an image plane of the detector unit. The system includes at least one symmetry replicator located at the at least one intermediate optical plane, thereby providing imaging of secondary speckle pattern on the detector array having a selected symmetry condition.

15 Claims, 4 Drawing Sheets

(58) Field of Classification Search
CPC ... G01B 2290/45; G01B 9/2014; G01P 3/366; G01P 3/38; G01H 9/00
USPC ............ 348/46; 359/738, 10; 356/498, 35.5; 382/128, 107; 369/103
See application file for complete search history.

(56) References Cited

U.S. PATENT DOCUMENTS

| | | | | |
|---|---|---|---|---|
| 9,036,011 | B2* | 5/2015 | Park | G01B 9/0201 348/46 |
| 2002/0074554 | A1* | 6/2002 | Sweatt | G03F 7/2039 257/78 |
| 2003/0067639 | A1* | 4/2003 | Wilson | G03H 1/26 359/10 |
| 2004/0233459 | A1* | 11/2004 | Booth | G01B 9/02095 356/498 |
| 2006/0055772 | A1* | 3/2006 | Rosen | G02B 27/48 348/31 |
| 2007/0040828 | A1* | 2/2007 | Zalevsky | G06T 11/001 345/418 |
| 2008/0088853 | A1* | 4/2008 | Hwang | G01B 11/02 356/498 |
| 2008/0175453 | A1* | 7/2008 | Hao | G06T 7/0012 382/128 |
| 2009/0147378 | A1* | 6/2009 | Zalevsky | G02C 7/02 359/738 |
| 2009/0207419 | A1* | 8/2009 | Hwang | G06F 3/0317 356/521 |
| 2009/0284748 | A1* | 11/2009 | Melman | G01B 9/0201 356/479 |
| 2010/0177164 | A1* | 7/2010 | Zalevsky | H01L 27/11524 348/46 |
| 2010/0226543 | A1* | 9/2010 | Zalevsky | A61B 5/024 382/107 |
| 2010/0296380 | A1* | 11/2010 | Handschy | G03H 1/02 369/103 |
| 2011/0001985 | A1* | 1/2011 | Igaki | G01P 3/36 356/614 |
| 2014/0205163 | A1* | 7/2014 | Stark | A61B 6/467 382/128 |
| 2015/0029819 | A1* | 1/2015 | Yacoubian | G01N 29/043 367/7 |
| 2019/0063898 | A1* | 2/2019 | Zalevsky | G01B 9/02045 |
| 2019/0212187 | A1* | 7/2019 | Leizerson | G01B 9/02094 |
| 2020/0041810 | A1* | 2/2020 | Sakai | G02B 27/48 |
| 2020/0072597 | A1* | 3/2020 | Zalevsky | A61B 5/0059 |
| 2020/0117018 | A1* | 4/2020 | Sakai | G02F 1/13 |

\* cited by examiner

SYSTEM AND METHOD FOR OPTICAL MONITORING USING SYMMETRY CONDITION OF LIGHT FIELD

TECHNOLOGICAL FIELD

The invention relates to systems and methods for optically monitoring and detection of various parameters of an object. The technique is relevant for monitoring biomechanical, as well as mechanical, parameters of objects.

BACKGROUND

Optical monitoring enables non-invasive inspection of various samples, being biological tissues or other samples. Various optical monitoring techniques enable motion detection and recognition of the sample and may be used as essential tools in a broad range of applications. Moreover, optical monitoring provides great significance especially in biomedical utilities for measuring physiological parameters of a human body, for example monitoring heart rate, breathing, blood pressure, etc.

Speckle-based monitoring techniques enable detection of vibrations and movement of tissue with high spatial resolution. For example, such techniques can detect heart beats of a subject from large distances and through clothes. These speckle-based techniques generally utilize monitoring time variation of patterns formed by secondary speckles generated due to self-interference of light components reflected and/or scattered from a surface of the sample. Movement and changes in orientation of the surface cause corresponding variations in the detected patterns, enabling highly sensitive monitoring.

For example, US2019063898, assigned to the assignee of the present application, describes a speckle-based imaging technique for monitoring movement parameter(s) of a moving object. According to this technique, an imaging system utilizes an optical transformer configured and operable for applying spatial image space transformation of at least one parameter of movement into geometric relation, by translating different components of six degrees of freedom of movement in a three-dimensional space into a lateral translation. The moving object is imaged on an image plane and image data is indicative of the moving object in an x-y plane, and motion data obtained from the imaged data is indicative of the six degrees of freedom of movement.

GENERAL DESCRIPTION

The present invention provides a system and method for improving speckle based optical monitoring allowing detection of various parameters including e.g. biomedical parameters of objects.

The present technique allows detection of translational, as well as tilt shifts, of a region of interest on the object. This allows improved separation between such translational shifts/movements and tilt shift for improved monitoring in terms of signal to noise ratio and filtering out undesired parameters such as patient's movement. To this end, the present technique utilizes symmetric replication of light collected from the region of interest.

More specifically, the present technique comprises collection of light returning from a region of interest (typically in response to coherent illumination thereof), applying one or more symmetric replications to the collected light at selected one or more optical planes, and generating image data indicative of speckle patterns in the collected light at a selected sampling rate to provide a sequence of image data pieces.

The collected sequence of image data pieces can then be processed to determine data about one or more parameters of the object. The data processing in the present technique is based on the inventors' understanding that the collected image data sequence, including speckle patterns formed from light self-interference after being reflected/scattered from the region of interest, includes data associated with a vibration or movement function of the region of interest. However, some of the movement data is lost as the collected image data pieces provide a direct measure of intensity of the collected light, while generally not providing a direct measure of phase of the collected light. Utilizing symmetric and positive optical signals allows reconstruction of additional data on movement of the region of interest, allowing simple monitoring of vibrations including tilt movements as well as translation movements of the region of interest.

More specifically, a symmetry replicator receives an input/incident light wavefront and transmits a corresponding output wavefront being a symmetric replication of at least a portion of the input wavefront. Applying such symmetry-replication based optical processing on a light wavefront being collected provides for obtaining a desired relation between the detected intensity of the speckle pattern and complex amplitude of the pattern.

For example, if a light wavefront is symmetric, the Fourier representation of the wavefront is Hermitian. When the Fourier representation of the wavefront is also symmetric, it has real representation (e.g. having a flat phase pattern).

Thus, the technique of the present utilizes an optical arrangement (e.g. one or more symmetry replicators) providing detection of a light wavefront, propagating from a region of interest (typically in response to coherent illumination) and having at least substantially real representation, and preferably real and positive image data (i.e. having generally uniform phase).

Data processing of the so-obtained image data typically includes determining correlations between consecutive image data pieces and using the determined correlations for generating a time correlation function indicative of movements of the region of interest including tilt and translation movements. Such data on movement of the region of interest may be used to determine data on various parameters of the object. For example, in the case of monitoring parameters of a patient (e.g., heart rate or any other physiological parameter), detection of translation movements in addition to tilt movement of a location on the patient's body that is being inspected/imaged, allows filtering patient's movements from vibrations associated with the desired parameter(s) to be monitored.

Thus, according to a broad aspect, the present invention provides a system comprising: an imaging assembly configured for performing a defocused imaging of a region of interest, the imaging assembly comprising an optical arrangement and a detector assembly configured for collecting light arriving from the region of interest while being defocused with respect said region of interest, and generating image data pieces indicative of light collected from said region of interest in a detecting plane defined by the detector assembly, the optical arrangement comprising at least one lens and being configured for defining at least one of at least one intermediate optical plane being a conjugate plane to said detecting plane and an intermediate Fourier plane with respect to said detecting plane of the detector assembly;

wherein the optical arrangement comprises at least one symmetry replicator located at said at least one intermediate optical plane, thereby providing imaging of secondary speckle patterns having a selected symmetry condition on said detecting plane.

According to some embodiments, the collection unit may comprise at least one lens unit defining at least one intermediate image plane and at least one intermediate Fourier plane, and wherein said at least one symmetry replicator comprises at least first and second symmetry replicators located respectively at said intermediate image plane and said intermediate Fourier plane, thereby affecting light distribution to provide substantially real amplitude patterns on the detector assembly.

The detector assembly may be configured for collecting image data pieces using two or more different exposure times, thereby allowing differentiating between spatial modes of movement within an overall exposure time of image collection. The use of two or more different exposure times enable increasing temporal resolution of data on movement of the region of interest. As described further below, the exposure time is associated with smearing of movement in the collected image data pieces. Thus, the use of image data pieces collected at different exposure times enables determining movement modes regardless of smearing caused by time integration, providing improved temporal resolution.

According to some embodiments, the system may further comprise a control unit connectable to said detector assembly and configured for receiving image data comprising at least one sequence of image data pieces and for processing said image data for determining one or more modes of movement of the region of interest.

The control unit may comprise at least a processing utility and a storage utility, said storage utility comprising at least one sector carrying pre stored data indicative of intermediate speckle response functions associated with one or more basic movement modes; said processing utility being configured and operable for processing received image data in accordance with said pre stored data and determining a combination of one or more movement modes generating a speckle pattern response in said received image data.

The control unit may be further configured for determining correlations between speckle patterns in consecutive image data pieces of said image data to thereby determine time function of movements of said region of interest. The control unit may be configured for monitoring movement/vibrations of the region of interest and utilize data on one or more modes of movement for determining between tilt movement and translation movement.

According to some embodiments, the one or more symmetry replicators may comprise an arrangement of two or more light reflecting surfaces positioned with reflecting surfaces thereof being parallel to a general direction of light propagation.

According to some embodiments, the one or more symmetry replicators may comprise a polygonal arrangement comprising three or more light reflecting surfaces, said polygonal arrangement being closed within a plane perpendicular to a general direction of light propagation and open along said general direction of light propagation.

According to one other broad aspect, the present invention provides a system comprising: an imaging unit comprising an optical and a detector assembly configured for collecting light arriving from a region of interest on an object while being defocused with respect said region of interest and generating defocused image data pieces indicative of light collected from said region of interest; the optical arrangement comprising at least one lens and being configured for defining at least one intermediate optical plane being a conjugate image plane or an intermediate Fourier plane with respect to a detecting plane of the detector assembly, and comprising at least one symmetry replicator located at said at least one intermediate optical plane, thereby providing imaging of secondary speckle patterns on said detector assembly having a selected symmetry condition; and wherein said detector assembly comprises a light splitting arrangement position in a path of collected light and configured for splitting said collected light to form two or more image replications on two or more detector arrays, said two or more detector arrays being operated for collecting image data pieces having corresponding two or more different exposure times According to yet another broad aspect, the present invention provides a method for use in monitoring an object, the method comprising:

collecting a light pattern returning from a region of interest in response to coherent illumination thereof, said collection comprises applying selected symmetry conditions at least one optical plane along collection path of the light pattern;

generating at least one sequence of image data pieces associated with secondary speckle patterns in said light pattern and determining signal amplitude maps of the collected image data in accordance with the symmetry conditions applied to the light pattern;

determining one or more modes of movements in accordance with the signal amplitude maps collected with said two or more different exposure times; and determining corresponding one or more modes of movement of said region of interest.

According to some embodiments, said applying symmetry conditions on at least one of a collected image and a Fourier of the collected image may comprise providing one or more symmetry replicators on at least one of intermediate Fourier and intermediate image planes along path of light collection.

According to some embodiments, said generating at least one sequence of image data pieces may comprise generating two or more sequences of image data pieces collected respectively using two or more different exposure times of image collection. Determining one or more modes of movements may further comprise processing secondary speckle patterns in said two or more sequences of image data pieces for determining spatial modes of movement of said region of interest while correcting for smeared images caused by time integration along exposure time of the image data pieces.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

As indicated above, the present invention provides a system and corresponding technique for monitoring parameters of an object such as sample, biological tissue or patient, using detection of a variation in speckle patterns formed by light reflected or scattered from the object. The present technique utilizes collection of one or more sequences of image data pieces associated with speckle patterns formed in light reflected from a region of interest on the object in response to coherent illumination thereof. Additionally, the present technique utilized optical manipulations of the collected light to provide collection of symmetrical optical pattern in at least one of, and preferably both of, an image plane and a Fourier plane with respect to the region of interest.

The present technique is based on the inventor's understanding that the collected speckle pattern is determined, as a function of time, in accordance with movement of the regions of interest. The collection of the speckle patterns and generation of image data pieces by a detector array typically involves an absolute value operation of the collected wavefront. This causes loss of information associated with the phase pattern of the wavefront. However, if the collected wavefront is symmetric and positive, the absolute value operation does not result in additional loss of data. Thereby the technique enables extraction of additional information from the collected speckle patterns.

Figure 1:
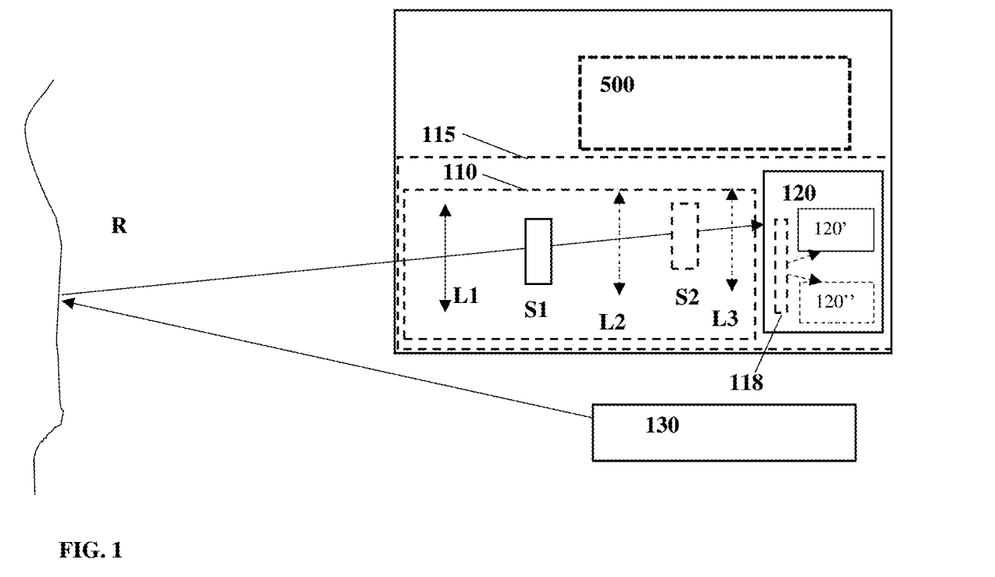
FIG. 1 schematically illustrates a system for use in monitoring parameters of an object according to some embodiments of the present invention.

Reference is made to FIG. 1 illustrating schematically a system 100 according to some embodiments of the present invention. The system 100 includes imaging unit or assembly 115 including an optical arrangement 110 and a detector unit or assembly 120 including at least one detector array 120'. The system 100 may also include a control unit 500 configured for receiving and processing image data pieces collected by the detector array 120'. The optical arrangement 110 is configured for directing light collected from a region of interest R on an object, toward the detector assembly 120. The optical arrangement 110 is configured to provide defocused imaging of the region of interest R on detecting plane of the detector assembly 120, i.e. configured such that the detector array 120' is located away from image plane with respect to the region of interest R. In other words, the optical arrangement is configured to provide imaging of an intermediate plane located between the region of interest and the optical arrangement. The control unit 500 is generally connected to the detector array 120' and configured for operating the detector array 120' and for receiving one or more image data pieces from the detector array 120' for processing. The system 100 may also include an illumination unit 130 configured for directing optical illumination including coherent light of selected wavelength range onto the region of interest, to thereby enable collection of reflected light and detection of secondary speckle patterns in the reflected light.

The optical arrangement 110 includes one or more lenses, generally two or more lenses, configured for collecting light propagating from the region of interest R and directing the light toward the detector assembly 120. The lenses of the optical arrangement 110 are arranged to define at least one intermediate optical plane being conjugate with respect to at least one of image plane and Fourier plane. Three such lenses L1, L2 and L3 are exemplified in FIG. 1 defining an intermediate (conjugate) image plane and an intermediate Fourier plane. The optical arrangement also includes one or more symmetric replicators, such as symmetry replicators S1 and S2 illustrated in FIG. 1, located at selected intermediate optical planes. Generally, the symmetry replicators are located in at least one of intermediate/conjugate image plane and intermediate Fourier plane. The symmetry replicators S1 and S2 are configured for transmitting light arriving thereto while generating reflections forming symmetrical replications of the wavefront. For example, the symmetry replicators S1 and S2 may be formed by one or more light reflecting surfaces positioned perpendicularly to the direction of light propagation, such that the light reflecting surface is located on and at certain length around the corresponding intermediate optical plane. More specifically, the one or more light reflecting surfaces are positioned in one or more planes parallel to optical axis of the collection unit 110.

The detector assembly 120 is configured for collecting image data pieces, associated with speckle patterns formed by self-interferences of light components reflected from the region of interest in response to coherent illumination thereof. Generally, the detector assembly 120 is operable for collecting image data using selected sampling rate and exposure time and transmitting at least one sequence of image data pieces for processing, e.g. by the control unit 500. In some configurations, the detector unit 120 may at least one detector array 120'. In some configurations, shown in FIG. 1 in dashed lines, the detector unit 120 may include light splitting arrangement 118 and two or more detector arrays 120', 120" configured such that collected light is split and directed toward the two or more detector arrays operable is different exposure times, e.g. $\Delta t_1$ and $\Delta t_2$, providing corresponding at least two sequences of image data pieces collected with different exposure times.

The control unit 500 is configured for receiving the at least one sequence of image data and for processing the image data pieces for determining data indicative of movement of the region of interest. Such data on movement of the region of interest R includes data indicative of general movement/vibration function $f(t)$ including tilt and translation variations of the region of interest. In some configurations, the control unit 500 may utilize processing of image data pieces associated with (captured or pre-processed to have) two or more different exposure times. Thus, the control unit 500 may operate for processing of at least two image data sequences and determining corresponding at least two sets of data on movement profile of the region of interest. This allows improved separation between tilt and translation movements of the region of interest. Additionally, the use of two or more different exposure times enables determining movement profile of the region of interest with improved temporal resolution. This is associated with smearing of the collected speckle patterns within the exposure time, while collection and processing of image data pieces with two or more different exposure times enables removing such smearing and determining movement modes of the region of interest.

Generally, in some configurations where the system 100 includes a detector unit 120 having one detector array 120' and thus providing a single sequence of image data pieces. In such configurations, the control unit 500 may utilize summation of image data pieces generating a second sequence of image data pieces characterized with longer effective exposure time (as the sum of two image data pieces may be indicative to image data collected in double exposure time) and lower sampling rate. It should be noted that such summation of image data pieces maintains the pattern of the collected light since the collection unit 110 provides a symmetric wavefront pattern reducing data loss associated with absolute value operation of the detector array. In some other configurations, as indicated above, the detector unit 120 includes two or more detector arrays configured for operating with corresponding two or more different exposure times and transmitting corresponding two or more sequences of image data pieces to the control unit for processing.

The control unit 500 operates for processing the one or more sequence of image data pieces for determining data on vibrations/movement of the region of interest. Generally, the processing includes determining correlations between consecutive image data pieces of at least one sequence of image data pieces, and to determine corresponding time correlation functions in accordance with the correlations between image data pieces over time. Such time correlation function is indicative of vibrations of the region of interest, allowing determination of data on one or more parameters of the region of interest (e.g. biomedical parameters, elastometry etc.). Additionally, according to the present technique, the processing includes utilizing image data pieces collected with two or more different exposure times and generally around the same time, and processing speckle patterns collected in the image data pieces for determining data on both tilt and translation movement of the region of interest R, and allowing to separate between the types of movement.

Typically, determining correlations between consecutive image data pieces provide high quality data indicative of a variation in angular orientation (tilt) of the region of interest. The present technique as described herein, utilizes one or more light symmetry replicators (e.g. S1 and S2) and processing of image data pieces with two or more different exposure times (by collecting the image data pieces or by summing image data pieces for generating artificial different exposure times) for determining both translation and tilt movements. This allows monitoring of various parameters of the region of interest while filtering out movements that may be considered as noise and not relating to the desired parameters. For example, determining both tilt and translation modes of movements enables filtering out patient movements from collected data on biomedical parameters of the patient, such as heart rate or breathing sounds. Generally, as described in more details further below, the present technique utilizes one or more symmetry replicators located in selected optical planes of the optical arrangement 110 to provide proper conditions for collection of speckle patterns allowing the processing to determine data of full movement characteristics of the region of interest.

Figure 2:
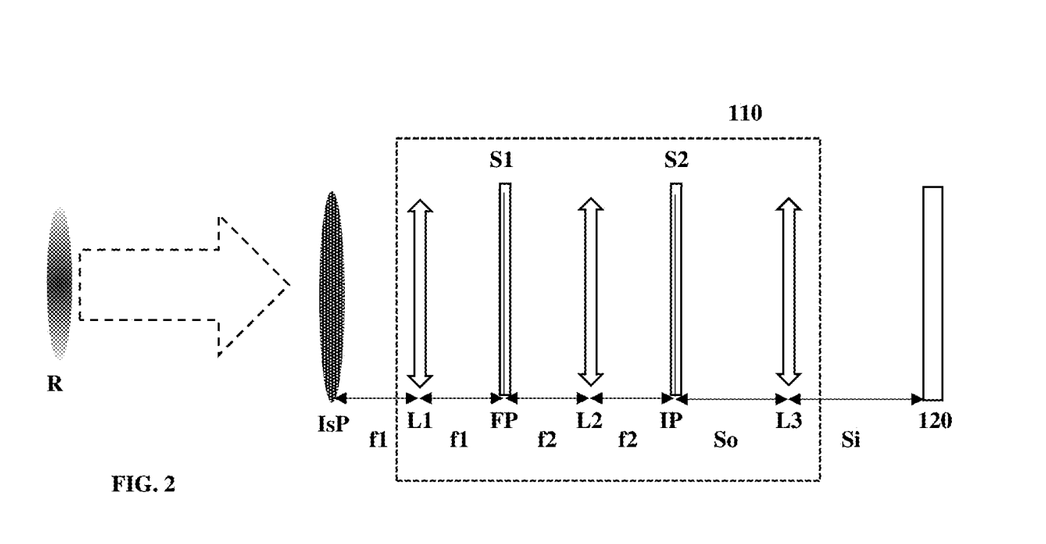
FIG. 2 illustrates operation of the optical arrangement used in a system configured according to some embodiments of the present invention.

As described in more details further below, the proper condition on the collected speckle pattern generally relates to the relation between the collected intensity pattern and the actual complex light field. A typical detector array is generally capable of detecting intensity of the collected light field, being a representation of absolute value of the light field averaged over the exposure time. Accordingly, to improve representation of the collected waveform, the present technique utilizes an optical arrangement including one or more symmetry replicators located in selected optical planes. The symmetry replicators are configured to affect light field passing therethrough, to form light field that is generally real and positive (i.e. has generally uniform phase). Reference is made to FIG. 2 exemplifying an optical arrangement 110 according to some embodiments of the invention. In this example, the optical arrangement 110 is configured for imaging an intermediate plane IsP located between the region of interest R and the optical arrangement 110, onto the detector unit 120, to provide imaging of secondary speckle patterns formed in light reflected from the region of interest in response to coherent illumination thereof. The optical arrangement includes selected number of one or more lenses generating at least one, and preferably at least two intermediate/conjugate optical planes selected from conjugate image plane IP and Fourier plane FP. FIG. 2 exemplifies three lenses L1, L2 and L3, located to provide imaging of the intermediate speckle plane IsP onto the detector unit 120, while generating both an intermediate Fourier plane FP and an intermediate/conjugate image plane IP with respect to the intermediate speckle plane IsP. The optical arrangement further includes one or more symmetry replicators, exemplified as S1 and S2 in FIG. 2. The symmetry replicators S1 and S2 are located in the intermediate Fourier FP and/or image IP planes and are configured to apply selected optical processing on wavefront at the intermediate optical plane and transmitting a symmetric wavefront toward the detector unit 120. More specifically, the one or more symmetry replicators S1, S2, are configured for receiving input wavefront and for transmitting output wavefront being a symmetric replication of at least a portion of the input wavefront. Applying such symmetry processing on the collected wavefront provides for obtaining a desired relation between the detected intensity of the speckle pattern and the complex amplitude thereof. Thus, if a wavefront is symmetric, the Fourier representation of the wavefront is Hermitian. When the Fourier representation of the wavefront is also symmetric, it must have real representation (e.g. having flat phase pattern). It should be noted that the symmetry replicators S1 and/or S2 are generally positioned to at least partially overlap with the corresponding intermediate optical planes. The symmetry replicators S1 and S2 generally have certain length along the optical axis of the collection unit 110 and are positioned such that the corresponding intermediate optical planes are located within the length of the symmetry replicators.

More specifically, as shown in the Example of FIG. 2, the optical arrangement 110 is configured to provide imaging of intermediate speckle plane IsP onto the detector unit 120. Lens L1 transmits light arriving from the plane IsP forming intermediate Fourier plane FP, where the plane IsP and the intermediate Fourier plane FP are located at distances f1 (corresponding to focal length thereof) before and after lens L1. Lens L2 is located at distance f2 (corresponding to focal length thereof) from the intermediate Fourier plane FP and collects light arriving from the intermediate Fourier plane FP to form the intermediate image plane IP at a distance f2 therefrom. Imaging lens L3 is located at a distance So from the intermediate image plane IP and a distance Si from the detection plane of the detector unit 120 to provide imaging of the intermediate image plane IP on the detector unit 120. It should be noted that the distances exemplified in FIG. 2 are illustrative, and additional optical arrangement may be used to provide intermediate Fourier plane FP and/or conjugate image plane IP.

Figure 3A:
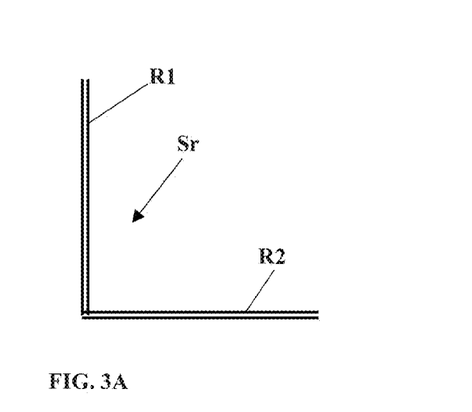
FIGS. 3A to 3C exemplify configurations of symmetry replicators according to some embodiments of the present invention, FIG. 3A exemplifies a corner replicator, FIG. 3B exemplifies a triangle replicator and FIG. 3C exemplifies a rectangular replicator.
Figure 3B:
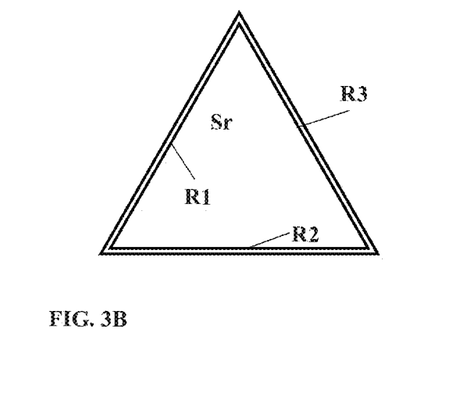
Figure 3C:
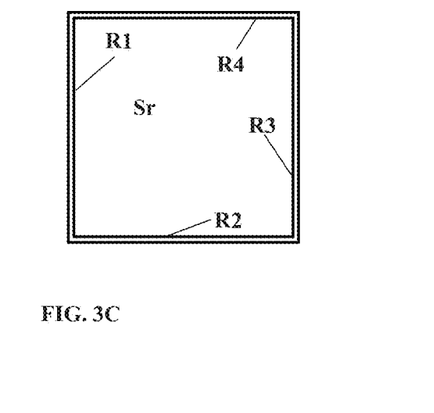

The symmetry replicators S1 and S2 may be configured from one or more light reflecting surfaces mounted with a reflecting surface being parallel to a general direction of light propagation, i.e. planes of the reflecting surfaces are parallel to the optical axis of collection unit 110. Generally, such light reflecting surfaces may located at the respective intermediate optical plane to generate duplication of the wavefront and thereby provide a symmetric output wavefront. Exemplary configurations of the symmetry replicators Sr are illustrated in FIGS. 3A to 3C using respectively two, three, or four light reflecting surfaces. FIG. 3A shows symmetry replicator Sr having two light reflecting surfaces R1 and R2 perpendicular to each other and positioned such that the surface of the light reflecting surfaces R1 and R2 are parallel to the direction of light propagation. FIG. 3B shows symmetry replicator Sr having three light reflecting surfaces R1, R2, and R3 arranged in a triangle shape and positioned such that the surface of the light reflecting surfaces are parallel to the direction of light propagation. FIG. 3C shows another configuration having four light reflecting surfaces R1-R4 in rectangular or square arrangement. The reflecting side of the light reflecting surfaces is typically directed inward such that the light reflecting surfaces R1 to R4 in these examples are facing each other. This provides symmetric replication of the wavefront as described above. The symmetry replicators Sr of FIGS. 3A to 3C are illustrated where the optical axis is perpendicular to the paper. The symmetry replicators Sr of FIGS. 3B and 3C are generally positioned such that the optical axis passes within the area surrounded by the reflecting surfaces, and the reflecting surfaces reflect light toward the optical axis. Generally, the symmetry replicators may be configured with a selected length, along the optical axis, selected in accordance with the numerical aperture of the one or more lenses of the optical arrangement and inner effective diameter of the symmetry replicator.

Figure 4:
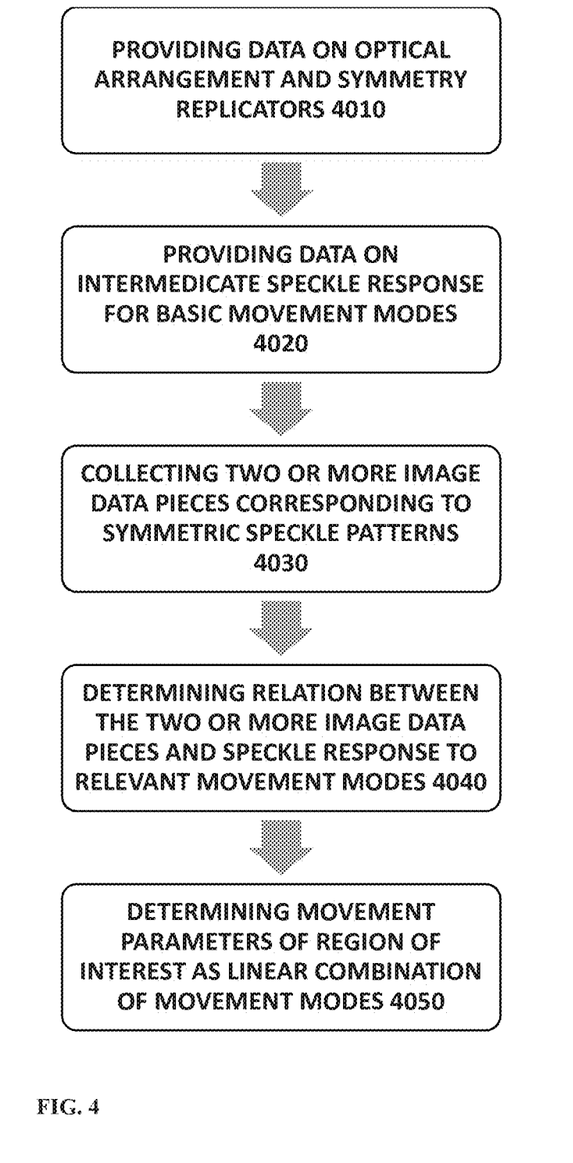
FIG. 4 is a flow chart exemplifying operation of monitoring according to some embodiments of the present invention.

As described above, the present technique utilizes generating image data pieces including at least one sequence of image data pieces, and processing of the image data includes processing of the image data pieces associated with two or more different exposure times of collection. FIG. 4 illustrates a flow chart exemplifying steps of processing of image data according to some embodiments of the present technique for determining modes of movement/vibrations of the region of interest. As indicated above, the present technique utilizes optical arrangement providing a wavefront having at least substantially real representation (e.g. using one or more symmetry replicators). To this end the processing generally utilizes data on the optical arrangement and symmetry replicator configurations 4010. For example, in some configurations, the optical arrangement may include a single symmetry replicator, e.g. located in intermediate image plane (IP in FIG. 2). In such configurations, the processing may utilize one or more phase retrieval techniques for estimating a wavefront of collected light from the intensity pattern detected by the detector unit 120. Further, the processing may use pre-determined, e.g. stored in a storage utility or unit, data on an intermediate speckle response associated with basic movement modes 4020. Generally, movement of the region of interest may be represented as a power (Taylor) series as $f(t)=\Sigma_n a_n t^n$. The coefficients $a_n$ may be vectorial, indicating a direction of translation movement or tilt movement (e.g. in 6-dimensional space). Further as described in more detail further below, the different modes of such movements, represented as $f_m(t)=a_m t^m$ are generally invertible by $t=f^{-1}=g(f(t))$. Thus, the present technique may utilize prior numeric determination of an intermediate response for a selected number of movement modes in indicating a variation of speckle pattern with respect to movement in a certain direction within the 6-dimensional movement space, and the corresponding variation in speckle pattern within the relevant exposure time of image collection. This is described in more details below with reference to equation 6 and may generally be determined based on data on the optical arrangement and symmetry replicator(s) affecting the collected wavefront.

Using this data, the system described above is operated for collecting image data including two or more image data piece 4030. The system then processes the two or more image data pieces for determining speckle patterns associated with two or more different exposure (collection) times. The processing of the image data includes, typically in addition to determining the correlation between the speckle patterns, determining the relation between the collected speckle patterns and relevant intermediate speckle response for different movement modes $f_m(t)$ of the region of interest 4040. Using these relations, the technique may determine coefficients of different movement modes $a_m$ to thereby determine data on the movement pattern of the region of interest as a linear combination of movement modes with relevant coefficients 4050. It should be noted that generally the movement of the region of interest is represented by vectorial representation, i.e. in the Taylor series $f(t)=\Sigma_n a_n t^n$ the coefficients $a_n$ may be vectors in three- or six-dimensional space.

Figure 5:
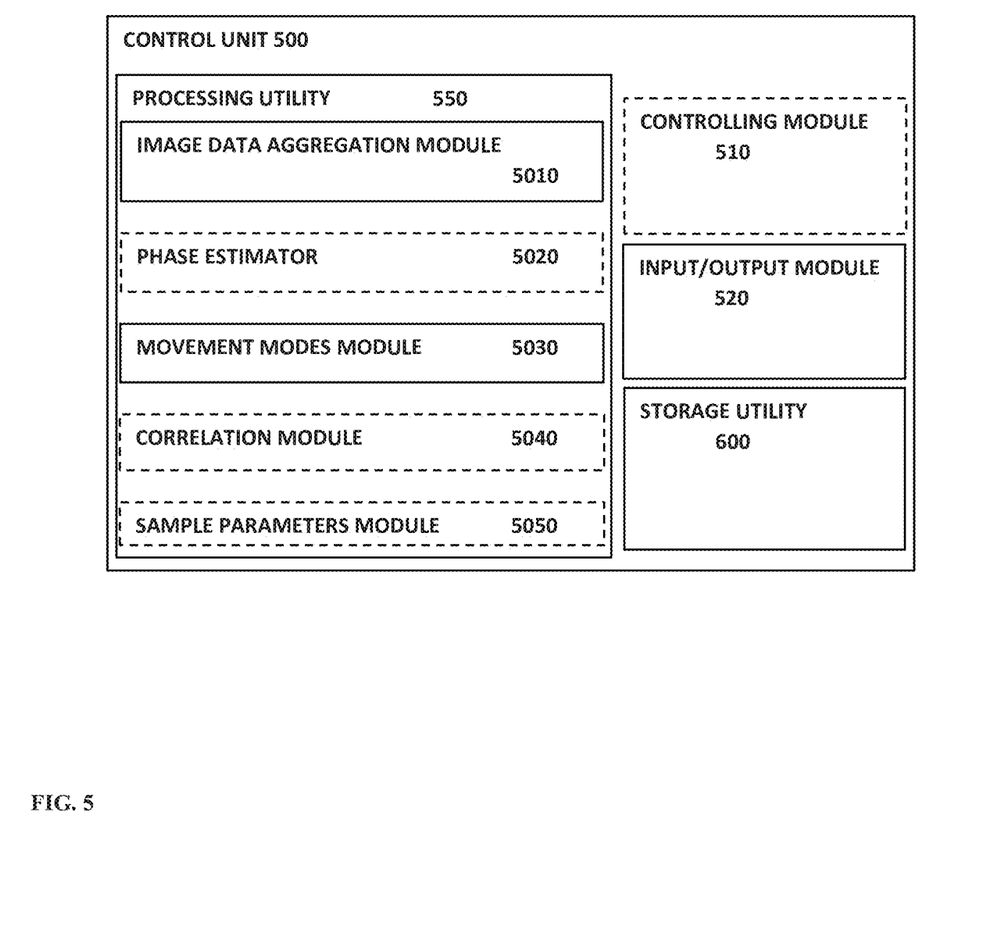
FIG. 5 illustrates module configuration of a control unit according to some embodiments of the present invention.

Reference is further made to FIG. 5 schematically illustrating a control unit 500 suitable for operating the system 100 according to some embodiments of the present technique. The control unit 500 may generally be configured as a computer unit including one or more processors, storage utility or unit and suitable input and output connections. The control unit 500 may be configured as part of the system 100 described above, be associated thereto by data communication and/or be separated therefrom and used for processing the collected image data remotely. Generally, the control unit 500 may include a controlling module 510 configured for controlling operation of the detector unit 120 and illumination unit 130 when used. The controlling module 510 may include an electronic circuit, connectable to the relevant units and configured to provide operational commands for turning units on or off and for collection of image data using relevant imaging parameters. The control unit 500 may generally also include input/output connections module 520, storage utility 600 and processor utility 550, which is typically formed by one or more processors. The storage utility or unit 600 may typically be pre-loaded with data indicative of the intermediate speckle response for selected basic movement modes. The pre stored data may be determined by numerical calculation using data on the optical arrangement used for light collection, and may also use data on distance from the region of interest, size of illumination spot and wavelength of illumination. Additionally or alternatively, the pre stored data may be determined based on experimental data collected from sample with predefined movement modes. The processing utility 550 is configured for receiving the one or more sequences of image data pieces collected by the detector unit 120 and for processing the received image data for providing data indicative of the region of interest. Generally, as indicated above, the processing may include determining data on vibrations of the region of interest using spatial correlations between consecutively collected image data pieces. Additionally, according to the present technique, the processing utilizes the use of one or more symmetry replicators in the optical arrangement for analyzing collected speckle patterns and determining data on movement modes of the region of interest.

The processing utility 550 may include one or more software or hardware modules operable for determining selected processing actions according to the present technique. For example, the processing utility 550 may include image data aggregation module 5010 and movement modes module 5030. In some configurations, the processing utility may also include one or more of phase estimator 5020, correlation module 5040 and sample parameters module 5050. The image data aggregation modules 5010 is configured for receiving image data pieces associated with one or more sequences of image data from the detector unit. The image data aggregation module 5010 may also operate for determining image data pieces having substantially similar time stamp (time of capture) while having different exposure times. As indicated above, in some embodiments, the image data aggregation module 5010 may also operate for combining image data pieces for generating data indicative of images captured with effective longer exposure time. The use of image data collected with two or more different exposure times enables separation of data on spatial distribution of the speckle averaged along the exposure time of image capturing. This allows the present technique to distinguish between different spatial patterns and determining modes of movement of the region of interest as discussed herein.

As described above, the optical arrangement 110 of the system 100 utilizes one or more symmetry replicators (e.g. S1 and S2 in FIG. 1) located in intermediate Fourier and/or conjugate Image planes along path of light collection. The symmetry replicators apply symmetric conditions on collected speckle patterns, to thereby enable extraction of additional data on complex amplitude of the collected light from pattern of collected intensity (by the detector unit). In some configurations, where the optical arrangement may include a single symmetry replicator (e.g. located at intermediate Fourier plane), the processing utility may include a phase estimator 5020 configured for determining the phase variation of speckle patterns collected in image data pieces in accordance with the intensity pattern of the image data. The phase estimator 5020 may utilize any existing phase determining technique and utilizes pre provided data on the use of symmetry replicator and its location and design. Generally, in some configurations, the phase estimator is adapted to determine regions within the collected speckle patterns, that are surrounded by lines of zero (or substantially zero) intensity, and determine positive or negative phase for such neighboring regions.

In accordance with determined phase of the collected image data pieces, or the pre provided data on the use of two symmetry replicators, generally providing real amplitude pattern, the processing operates for determining modes of movement of the region of interest. The movement modes module 5030 operate for determining relations between spatial patterns in image data pieces collected with different exposure times. To this end the movement modes module 5030 utilizes the pre stored data on intermediate speckle responses stored in the storage utility 600 or available from a network storage module. The movement mode module 5030 operates to determine basic movement modes based on selected basis (e.g. based on Taylor power series or other basis) decomposition. As described in more detail further below, the movement modes module 5030 may operate for processing image data pieces collected with similar time stamps and different exposure times (e.g. time stamps are similar or overlapping taking into account exposure time) for determining mode composition of movement of the region of interest. This provides data indicative of modes and directions of movement of the region of interest during time of collection of the image data pieces as described in more details further below. This separation of modes of movements, combined with data on movement of the region of interest along time, e.g. determined by the correlation module 5040 in accordance with general spatial correlation between image data pieces, provides data on tilt as well as translation movement of the region of interest and allows separation between the movement modes.

Determining data on movement, e.g. including micro and nano scale movement, may be used for determining various parameters of the region of interest, including for example biomedical parameters such as heart rate, or elastometry parameters. To this end the processing utility 550 may include a sample parameters module 5050 configured for determining one or more selected parameters of the region of interest in accordance with detected movement pattern thereof. The sample parameters module 5050 may utilize pre provided data on the type of sample at the region of interest and one or more pre provided scaling/calibration data and or selected additional processing. For example, the vibrations/movement of the region of interest may be indicative of heart operation, breathing movement or sounds, blood pressure, glucose variation, etc. Such data on parameters of the region of interest R may be presented to an operator, user or stored for further processing locally and/or in remote storage utilities.

The present technique is based on the inventors' understanding that suitable optical manipulation may be used to decipher direct relations between data on slight movement of the region of interest and pattern of light reflected therefrom. Generally, it is assumed that the time variation of the collected speckle patterns is caused due to vibrations in the region of interest, and that the vibration function may be a general function (that can be modeled as a Taylor series) $f(t)=\Sigma_n a_n t^n$. The intensity of the speckle pattern $s(x,t)$, formed by spatial Fourier transform from the pattern of light reflected from the region of interest due to defocusing of the lens arrangement, is thus described by:

$$I(x',t)^2 = \left| \int_{-\infty}^{\infty} rect\left(\frac{x}{\Delta x}\right) s(x-f(t)) e^{2\pi i x \cdot x'} dx \right|^2 \quad \text{(equation 1)}$$

That can be simplified to:

$$I(x',t) = \left| \int_{-\infty}^{\infty} rect\left(\frac{x}{\Delta x}\right) s(x-f(t)) e^{2\pi i x \cdot x'} dx \right| \approx \quad \text{(equation 2)}$$
$$Real\left\{ \int_{-\infty}^{\infty} rect\left(\frac{x}{\Delta x}\right) s(x-f(t)) e^{2\pi i x \cdot x'} dx \right\} =$$
$$Real\{sinc(\Delta x x') * (S(x') e^{2\pi i x' \cdot f(t)})\}$$

where $\Delta x$ is the size of the illumination spot, * denotes the convolution operation, and S is the Fourier transform of the speckle pattern s.

The intensity captured is typically described by the absolute value operator. However, if the distribution of the collected light pattern s(x) is real and positive then there is only a small difference between the real operation and the absolute value in sense of content of information (i.e. there is no information lose due to the absolute value square operation associated with capturing intensity data). Accordingly, and as described in more details further below, the configuration and operation of the system according to the present technique provides one or more symmetry replicators in the path of light collection, providing collection of light field (speckle pattern) converted to a generally real distribution (i.e. has substantially flat phase due to the replications). Preferably, the light distribution may be real and positive, however, suitable phase retrieval techniques, such as "zero crossing" algorithms, allows digital reconstruction of the real value from the absolute value by finding the spatial locations where the distribution crosses the zero value. Using regions surrounded by lines of zero (or intensity below a selected threshold), the sign of the signal distribution can be corrected in the different regions of the image data around those zero crossing locations to reconstruct a non-positive real distribution from its absolute value distribution. As indicated above, in some configurations, the collected light pattern may be symmetrized only in one plane thereof (e.g. Fourier plane), in such configurations, phase retrieval techniques may be used for determining complex amplitude and phase distribution of the collected light pattern.

For example, assuming the collected pattern s is symmetric in space, the Fourier transform S will be Hermitian. Symmetry in Fourier space (i.e. symmetric S) results in the light field s having a real representation. Under this assumption, and for illumination spot that is large with respect to expected motion amplitude of the region of interest R, or speed of motion multiplied with characteristic monitoring time, the sinc function in equation 2 may be approximated by a Dirac delta function providing from equation 2:

$$I(x',t)=S(x')\text{Real}\{e^{2\pi i x' f(t)}\} \quad \text{(equation 3)}$$

And since the measurement is performed with certain exposure time, the actual detected intensity is averaged in time providing:

$$\bar{I}(x', \Delta t) = \frac{1}{\Delta t}\int_{\Delta t} I(x', t)dt = S(x')\text{Real}\left\{\int_{\Delta t} e^{2\pi i x' f(t)} dt\right\} = \quad \text{(equation 4)}$$
$$S(x')\text{Real}\left\{\int_{-\infty}^{\infty} rect\left(\frac{t}{\Delta t}\right) e^{2\pi i x' f(t)} dt\right\}$$

Further, assuming that $f(t)$, describing the movement/vibrations at the region of interest, is invertible as $t=f^{-1}=g$ ($f(t)$) allows replacing the integration parameter according to $$dt = \frac{1}{\sum_n a_n n t^{n-1}} df = \frac{1}{\sum_n a_n n (g(f))^{n-1}} df.$$

For relatively short exposure time, $f(t)$ may typically be a monotonic function of time, providing:

$$\bar{I}(x', \Delta t) = \quad \text{(equation 5)}$$
$$\frac{S(x')}{\Delta t}\text{Real}\left\{\int_{-\infty}^{\infty} rect\left(\frac{g(f)}{\Delta t}\right) \frac{1}{\sum_n a_n n(g(f))^{n-1}} e^{2\pi i x' f} df\right\}$$

allowing the determination of the Fourier transform on $f$ coordinate:

$$T(x') = F\left(\frac{rect\left(\frac{g(f)}{\Delta t}\right)}{\sum_n a_n n(g(f))^{n-1}}\right). \quad \text{(equation 6)}$$

Equation 6 enables defining an intermediate speckle response for a basic movement mode $T_n(x')$ for one or more modes of movement n. This expression can be numerically computed providing that the intensity pattern in Fourier space equals to:

$$\bar{I}(x',\Delta t)=S(x')\text{Real}\{T(x',\Delta t)\}/\Delta t \quad \text{(equation 7)}$$

thus, allowing to determine $f(t)$ using collection of intensity pattern sequences (speckle patterns) in two or more exposure times, to thereby isolate $\Delta t$ in equation 7. Generally, determining movement of the region of interest as a combination of movement modes as described herein above, enables improved resolution. This is based on the above estimation, replacing the sinc function with the Dirac delta function, and directly associated with determining data based on sequences of image data pieces collected with two or more different exposure times.

For example, given a linear translation motion with (temporary) constant velocity $f(t)=a_1 t$ (for a short period, e.g. in the range of exposure time of single frame), providing inverse function $g(f)=t=f/a_1$, and integration parameter change by $dt=df/a_1$, which results in equation 6 taking the form:

$$T(x')=\Delta t\ \text{sinc}(a_1\Delta tx') \quad \text{(equation 8)}$$

Leading to:

$$\bar{I}(x',\Delta t)=S(x')\text{sinc}(a_1\Delta tx') \quad \text{(equation 9)}$$

Indicating that measurements of the collected pattern at different exposure times $\Delta t$ enables simple extraction of the linear translation of the region of interest and thus reconstruction from movement modes and intermediate speckle response. It should however be noted that x' is a Fourier transform coordinate, having a dimension of 1/length (m$^{-1}$). Thus, the spatial coordinate x, at the region of interest, is to be normalized by $\lambda Z$ where Z is the defocusing distance and $\lambda$ is the optical wavelength.

In further analysis of equation 2 above, with respect to conditions where the sinc function cannot be assumed as a Dirac delta function, the collected intensity pattern may be represented as:

$$I(x', t) \approx \text{Real}\left\{\int_{-\infty}^{\infty} \text{sinc}(\Delta x x'')S(x'-x'')e^{2\pi i f(t)(x'-x'')} dx''\right\} = \quad \text{(equation 10)}$$
$$\text{Real}\left\{e^{2\pi i f(t)x'}\int_{-\infty}^{\infty} \text{sinc}(\Delta x x'')S(x'-x'')e^{-2\pi i f(t)x''} dx''\right\}$$

maintaining the assumption that the illumination spot size $\Delta x$ is large relative to the movement of the region of interest. This provides that the width of the sinc function $1/\Delta x$ is small and thus x" varies within a small range of values and can approximated to first order providing $e^{-2\pi i f(t)x''} \approx 1-2\pi i f(t)x''$. Thus, the intensity pattern is:

$$I(x', t) \approx \text{Real}\left\{e^{2\pi i f(t)x'}\left(\int_{1/\Delta x} S(x'-x'')dx'' - \quad \text{(equation 11)}\right.\right.$$
$$\left.\left.2\pi i f(t)\int_{1/\Delta x} x'' S(x'-x'')dx''\right)\right\}.$$

This means that the resolution of the spatial spectrum is limited by $\int_{1/\Delta x} S(x'-x'')dx''$ and that the field of view of s(x) is limited and therefore the second term in equation 11 can be approximated as:

$$2\pi i f(t) \int_{1/\Delta x} x'' S(x'-x'')dx'' \approx 2\pi i f(t) S(x') \int_{1/\Delta x} x'' dx'' = \quad \text{(equation 12)}$$

$$S(x')^{\pi i f(t)/2\Delta x^2}$$

Thus, the collected intensity may be described by:

$$I(x',t) \approx \text{Real}\{e^{2\pi i f(t)x'} S(x')(1+\pi i f(t)/2\Delta x^2)\} = S(x')$$
$$\text{Real}\{e^{2\pi i j(t)x'}(1+\pi i f(t)/2\Delta x^2)\} \quad \text{(equation 13)}$$

And after integration of exposure time and replacing integration parameter to df as described above provides:

$$\bar{I}(x', \Delta t) = \frac{S(x')}{\Delta t} \text{Real} \quad \text{(equation 14)}$$

$$\left\{ \int_{-\infty}^{\infty} rect\left(\frac{g(f)}{\Delta t}\right)\left(1 + \frac{\pi i f}{2\Delta x^2}\right) \frac{1}{\sum_n a_n n(g(f))^{n-1}} e^{2\pi i x' f} df \right\}$$

Accordingly, and as described in equation 6, the expression of the intermediate speckle response for the basic movement mode:

$$T(x') = F\left( \frac{rect\left(\frac{g(f)}{\Delta t}\right)\left(1 + \frac{\pi i f}{2\Delta x^2}\right)}{\sum_n a_n n(g(f))^{n-1}} \right) \quad \text{(equation 15)}$$

can be determined numerically, and thus determining Fourier transform provides:

$$\bar{I}(x',\Delta t) = S(x')\text{Real}\{T(x',\Delta t)\}/\Delta t \quad \text{(equation 16)}$$

where T(x') is a transfer function determined in accordance with selection of approximation.

Thus, as indicated above, the use of one or more symmetry replicators in the path of light collection enables processing of the collected light patterns and retrieval of data directly related to modes of movement of the region of interest in micro and nano scale. The present technique may also use image collection with two or more different exposure times for allowing simple extraction (e.g. linear) of the different modes from the image data. This allows separation between translation movement and tilt/vibrations of the region of interest.

The invention claimed is:

1. A system comprising:
an imaging assembly configured and operable to obtain a defocused image of a region of interest, the imaging assembly comprising an optical arrangement and a detector assembly comprising at least one detector array defining a detecting plane and configured and operable to collect light arriving from the region of interest while being defocused with respect to said region of interest, and to generate image data indicative of secondary spackle pattern in collected light, the optical arrangement being configured to define at least one intermediate optical plane being at least one of a conjugate plane to said detecting plane and a Fourier plane with respect to said detecting plane, the optical arrangement comprising at least one lens and at least one symmetry replicator located at said at least one intermediate optical plane to provide imaging of the secondary speckle patterns having a selected symmetry condition on said detecting plane; and a control unit connectable to said detector assembly for receiving the image data, the control unit comprising a processing utility configured for processing the image data and determining one or more modes of movement of the region of interest, said processing comprising utilizing predetermined data indicative of intermediate speckle response functions associated with one or more basic movement modes to process two or more sequences of image data pieces of said image data corresponding to two or more different exposure times, respectively, and determine relations between spatial patterns of the image data pieces of said two or more sequences in accordance with said predetermined data indicative of the intermediate speckle response functions, and determine a combination of one or more movement modes generating speckle pattern response in the image data pieces, thereby enhancing temporal resolution of the detection of said one or more modes of movement of the region of interest.

2. The system of claim 1, wherein said at least one lens defines said conjugate plane and said Fourier plane, and the at least one symmetry replicator comprises at least first and second symmetry replicators located respectively at said conjugate plane and said Fourier plane, thereby affecting light distribution to provide substantially real amplitude pattern on the detector assembly.

3. The system of claim 1, wherein said detector assembly comprises at least first and second detector arrays and a light splitter directing collected fight onto said at least first and second detector arrays; wherein said first and second detector array are configured and operable to generate the image data pieces associated with first and second different exposure times of said at least two exposure times.

4. The system of claim 1, wherein said detector assembly is configured and operable to collect the image data pieces using said two or more different exposure times, thereby allowing differentiating between the spatial modes of movement within an overall exposure time for image collection.

5. The system of claim 1, wherein said control unit is associated with a storage, said storage storing said predetermined data indicative of the intermediate speckle response functions associated with one or more basic movement modes.

6. The system of claim 1, wherein said control unit comprises an image data aggregation module, configured and operable to preprocess a received one sequence of image data pieces having certain exposure time and generate at least a second sequence of image data pieces characterized with longer effective exposure time as compared to said certain exposure time, thereby providing said two or more sequences of the image data pieces.

7. The system of claim 1, wherein said control unit comprises a movement modes module configured and operable to process said two or more sequences of image data pieces and determine a movement function as a composition of the basic movement modes, thereby determining data indicative of direction and amplitude of the movement of the region of interest within an exposure time for collection of the image data pieces.

8. The system of claim 7, wherein said control unit further comprises a correlation module configured and operable to process one or more sequences of the image data pieces and determine at least one correlation function indicative of spatial correlations between the image data pieces in said one or more sequences of image data pieces, said control unit being configured and operable to utilize said data indicative of the direction and amplitude of movement of the region of interest within the exposure time for collection of the image data pieces and data on said at least one correlation function for separately determining data on translation movement and on tilt movement of said region of interest.

9. The system of claim 8, wherein said control unit is configured and operable to monitor movement/vibrations of the region of interest and utilize data on one or more modes of movement for differentiating between tilt movement and translation movement.

10. The system of claim 1, wherein said one or more symmetry replicators comprise an arrangement of two or more light reflecting surfaces positioned with the two or more light reflecting surfaces thereof being parallel to an optical axis of said imaging unit.

11. The system of claim 1, wherein said one or more symmetry replicators comprise at least one symmetry replicator comprising a polygonal arrangement of three or more light reflecting surfaces being parallel to optical axis of said imaging unit, said polygonal arrangement being closed within a plane perpendicular to said optical axis allowing light travelling along said optical axis to pass within said polygonal arrangement.

12. A method for use in monitoring an object, the method comprising:
collecting a light pattern returning from a region of interest in response to coherent illumination thereof at a detecting plane, said collection comprises applying selected symmetry conditions in at least one optical plane along a collection path of the light pattern, said at least one optical plane being at least one of a conjugate plane to said detecting plane and a Fourier plane with respect to said detecting planer and generating image data indicative of secondary speckle patterns in said light pattern;
processing said image data to determine one or more modes of movements of the region of interest, said processing comprising utilizing predetermined data indicative of intermediate speckle response functions associated with one or more basic movement modes, to process two or more sequences of image data pieces of said image data corresponding to two or more different exposure times, respectively, and determining relations between spatial patterns of the image data pieces of said two or more sequences in accordance with said predetermined data indicative of the intermediate speckle response functions, and determine a combination of one or more modes of movement generating speckle pattern response in the image data pieces, thereby enhancing temporal resolution of the detection of said one or more modes of movement of said region of interest.

13. The method of claim 12, wherein said applying selected symmetry conditions at least one optical plane comprises providing one or more symmetry replicators on at least one of said Fourier plane and said conjugate plane.

14. The method of claim 12, wherein said generating said image data comprises generating two or more sequences of image data pieces collected respectively using two or more different exposure times of image collection.

15. A system comprising:
an imaging assembly comprising an optical arrangement and a detector assembly configured for collecting light arriving from a region of interest on an object at a detecting plane, while being defocused with respect said region of interest and generating defocused image data pieces indicative of light collected from said region of interest;
said the optical arrangement comprises at least one lens configured to define at least one intermediate optical plane being at least one of a conjugate plane to said detecting plane and a Fourier plane with respect to said detecting plane, and at least one symmetry replicator located at said at least one intermediate optical plane, thereby providing imaging of secondary speckle pattern on said detector unit having a selected symmetry condition; and
said detector assembly comprises two or more detector arrays positioned at said detecting plane, and operated for collecting image data pieces having corresponding two or more different exposure times, and a light splitting arrangement position in path of collected light and configured and operable to split said collected light to form two or more image replications on said two or more detector arrays; and
a control unit connectable to said detector assembly for receiving the image data pieces having corresponding two or more different exposure times, the control unit comprising a processing utility configured for processing the image data pieces and determining one or more modes of movement of the region of interest, said processing comprising utilizing predetermined data indicative of intermediate speckle response functions associated with one or more basic movement modes to process said image data pieces, and determine relations between spatial patterns of the image data pieces of said two or more sequences in accordance with said predetermined data indicative of the intermediate speckle response functions, and determine a combination of one or more movement modes generating speckle pattern response in the image data pieces, thereby enhancing temporal resolution of the detection of said one or more modes of movement of the region of interest.

* * * * *